United States Patent [19]
Gawlik et al.

[11] 3,773,132
[45] Nov. 20, 1973

[54] ELECTRIC PROPULSION MOTOR MOUNTING AND DRIVE MEANS

[75] Inventors: Edward F. Gawlik, Seven Hills; Richard A. Schwehr, Mentor, both of Ohio

[73] Assignee: Towmotor Corporation, Cleveland, Ohio

[22] Filed: Sept. 27, 1971

[21] Appl. No.: 184,002

[52] U.S. Cl............ 180/64 R, 180/54 E, 180/65 R, 248/8
[51] Int. Cl............................................. B60k 1/00
[58] Field of Search............ 180/65 R, 65 A, 54 E, 180/57, 64 R, 64 M; 248/6, 7, 8; 105/133

[56] References Cited
UNITED STATES PATENTS

| 1,728,236 | 9/1929 | Froesch | 180/57 |
| 3,482,808 | 12/1969 | Rofe et al. | 248/9 |
| 3,217,825 | 11/1965 | Hauxwell et al. | 180/54 E |
| 3,481,420 | 12/1969 | Roll | 180/65 R |
| 1,056,253 | 3/1913 | Brooks | 180/64 M |
| 1,508,226 | 9/1924 | Holy | 180/57 X |

*Primary Examiner*—Benjamin Hersh
*Assistant Examiner*—David M. Mitchell
*Attorney*—Fryer, Tjensvold, Feix, Phillips & Lempio

[57] ABSTRACT

A motor mounting and drive means for an electric propulsion motor of an electric lift truck, or the like, which reduces road shock into the motor as well as reduces motor vibration into the vehicle chassis. The mounting and drive arrangement comprise a pair of support brackets which are rigidly secured to the opposite end faces of the electric propulsion or traction motor and resiliently secured to the vehicle frame to suspend the motor in a horizontal position subjacent a compartment of the vehicle for housing the batteries for supplying electrical power to the motor. In addition a universal joint is employed to couple the drive shaft of the electric motor to a differential for driving one set of wheels of the vehicle.

3 Claims, 3 Drawing Figures

INVENTORS
EDWARD F. GAWLIK
RICHARD A. SCHWEHR

BY
*Fryer, Tjensvold, Feix, Phillips & Lempio*
ATTORNEYS

INVENTORS
EDWARD F. GAWLIK
RICHARD A. SCHWEHR

ELECTRIC PROPULSION MOTOR MOUNTING AND DRIVE MEANS

BACKGROUND OF THE INVENTION

Heretofore the electric propulsion or traction motor of electric lift trucks has typically included an integral base, which in turn is rigidly bolted to the truck frame to support the motor in a horizontal position. The drive shaft of the motor has been splined or otherwise directly coupled to the input shaft of a differential for driving the front wheels of the truck. With such a rigid mounting and direct drive arrangement road shock has been imparted to the motor shaft, and as a result, motor life has been minimized. In addition, motor vibration has been undersirably transmitted to the vehicle chassis with such previous electric motor mounting and drive arrangements.

SUMMARY OF THE INVENTION

The present invention relates to electric lift trucks and the like, and is more particularly directed to an improved resilient mounting and flexible drive arrangement for the electric propulsion motor thereof.

It is an object of the present invention to provide an improved electric propulsion motor mounting and drive arrangement for an electric lift truck which effectively reduces the transmission of road shock to the motor and thereby materially extends the life thereof.

A further object of the invention is the provision of an electric motor mounting and drive arrangement of the class described which substantially reduces the transmission of motor vibration into the vehicle chassis.

In the accomplishment of the foregoing and other objects and advantages, an electric motor mounting and drive arrangement in accordance with the present invention generally includes a pair of support brackets respectively rigidly secured adjacent the opposite ends of an electric propulsion motor of an electric lift truck, means for resiliently securing the support brackets to horizontal members of the truck frame to resiliently suspend the motor in a horizontal position, and a universal joint coupling the rotary drive shaft of the electric propulsion motor to a differential carried by the truck frame for driving one set of the truck wheels.

DETAILED DESCRIPTION OF THE PREFERRED EMBODIMENT OF THE INVENTION

Figure 1:
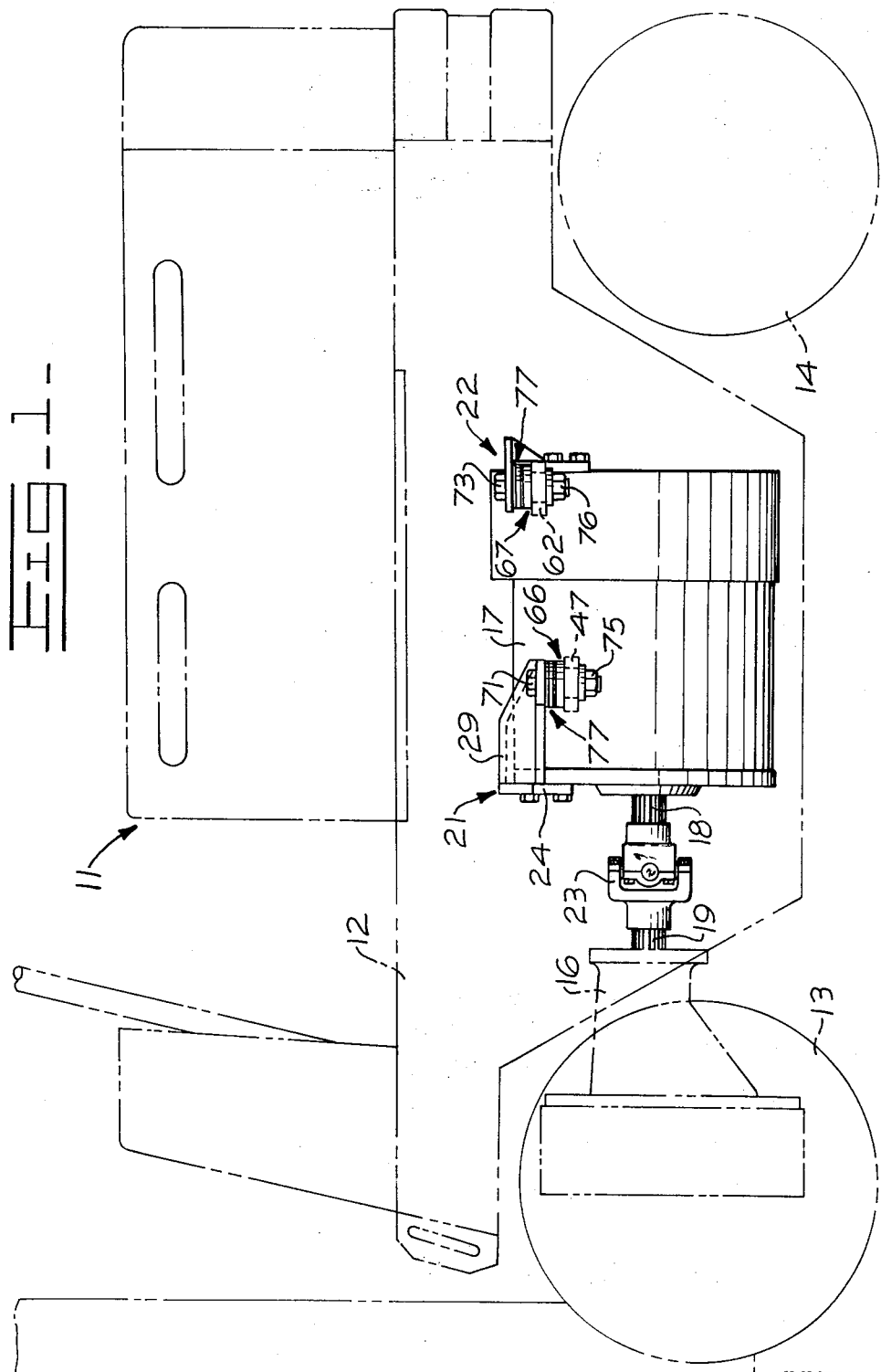
FIG. 1 is a side elevational view of an electric lift truck embodying an electric propulsion motor mounting and drive arrangement in accordance with the present invention.

Referring now to FIG. 1 in detail, there is shown an electric lift truck 11 having a frame including a pair of transversely spaced side panels 12. Sets of front and rear wheels 13 and 14 are journalled at the opposite ends of the frame in a conventional manner, and a differential 16 is carried by the frame and coupled to the front wheels 13 in accordance with usual practice.

Drive power to the front wheels 13 is facilitated by means of an electric traction or propulsion motor 17 mounted to the truck frame in a horizontal position subjacent a battery compartment (not shown) for housing batteries for supplying electrical power to the motor. The motor 17 includes a splined rotary drive shaft 18 which is ultimately coupled to the input shaft 19 of differential 16 to thereby transmit motive power to the front wheels 13.

Heretofore the electric propulsion motor of an electric lift truck of the general type outlined above has typically included an integral base which has been rigidly bolted to members of the truck frame to facilitate mounting thereof. In addition the usual practice with an electric propulsion motor has been to directly connect the motor drive shaft to the input shaft of the differential associated with the front wheels. Such a conventional arrangement has resulted in shortened life of the propulsion motor by virtue of road shock being imparted to the direct coupled drive shaft of the rigidly mounted propulsion motor, and conversely the arrangement has resulted in the transmission of motor vibration into the truck frame.

The foregoing disadvantages are obviated in accordance with the particularly salient aspects of the present invention by means of a resilient motor mounting and flexible drive coupling which serve to reduce the transmission of road shock to the electric propulsion motor 17 and the transmission of motor vibration to the truck frame.

In this regard, the electric propulsion motor 17 is not provided with an integral base to facilitate rigid bolting of the motor to the frame of truck 11. Rather, a pair of support brackets 21 and 22 are rigidely secured to the motor respectively adjacent the front and rear ends thereof, and means are provided to resiliently attach the brackets to the truck frame in a manner to resiliently suspend the motor therefrom in a horizontal position.

In addition, a universal joint 23 is employed to couple the splined drive shaft 18 of the electric propulsion motor to input shaft 19 of differential 16. The brackets and resilient attachment means, and the universal joint thereby respectively comprise the motor mounting and flexible drive coupling of previous mention.

Figure 3:
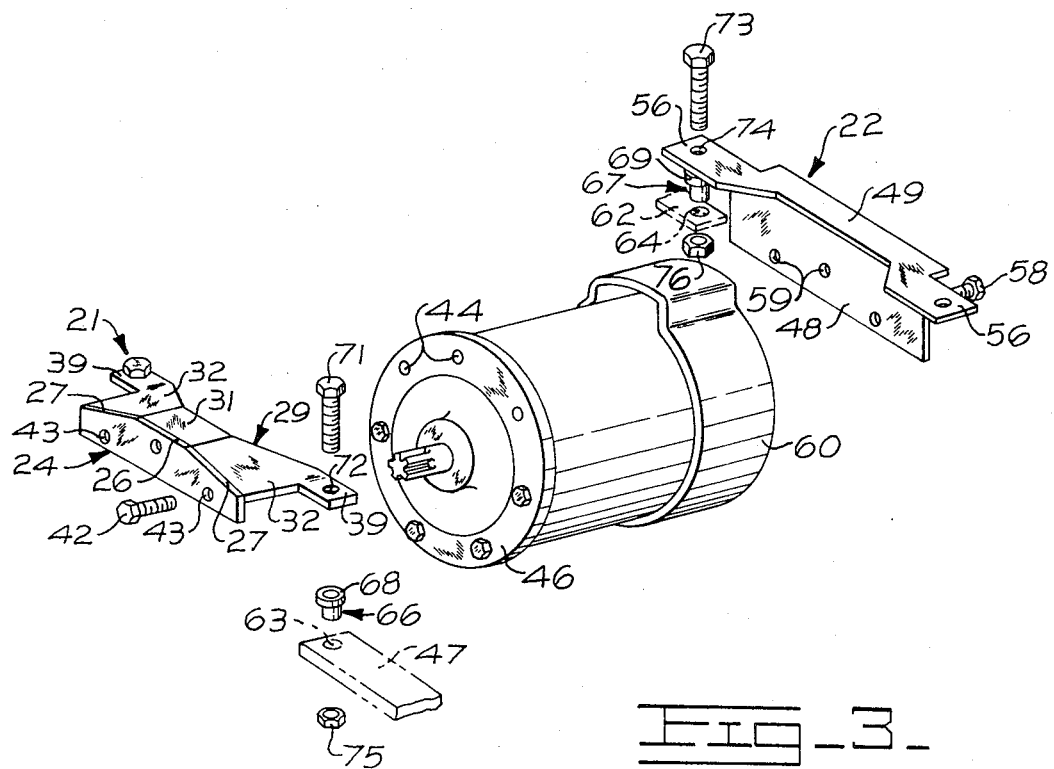
FIG. 3 is an exploded perspective view of the mounting arrangement.

Considering now the resilient motor mounting in more detail, the front support bracket 21 includes a generally rectangular end plate 24 preferably having an upper edge defined by a horizontal central portion 26 and outer portions 27 oppositely downwardly inclined therefrom, as best shown in FIG. 3. Bracket 21 also includes an upper plate 29 integral with end plate 24 and projecting right angularly therefrom adjacent its upper edge.

The upper plate is generally conformed to the configuration of the upper edge of the end plate such that the upper plate includes a horizontal central portion 31 with outer portions 32 laterally oppositely downwardly inclined therefrom. The leading edge of upper plate 29 is best provided with a central dovetail notch 34 defined by converging rearwardly extending angular edge portions 36 of outer plate portions 32 which terminate in the leading edge 38 of plate central portion 31 which is parallel to end plate 24. The lower side edges of outer portions 32 of upper plate 29 are provided with laterally outwardly projecting horizontal ears 39 adjacent the leading edge thereof, which ears are parallel to the central portion 31 of the upper plate.

Rigid attachment of bracket 21 to the motor 17 is facilitated by means of bolts 42 traversing apertures 43 provided in end plate 24 and threadably engaging circumferentially spaced taps 44 formed in the front end face of the motor to also facilitate bolted attachment of a front end cover plate 46 thereto. With the bracket 21 thus rigidly secured to the front end face of the motor, the upper plate 29 engages the upper periphery of the motor with the horizontal ears 39 projecting laterally outward therefrom.

Figure 2:
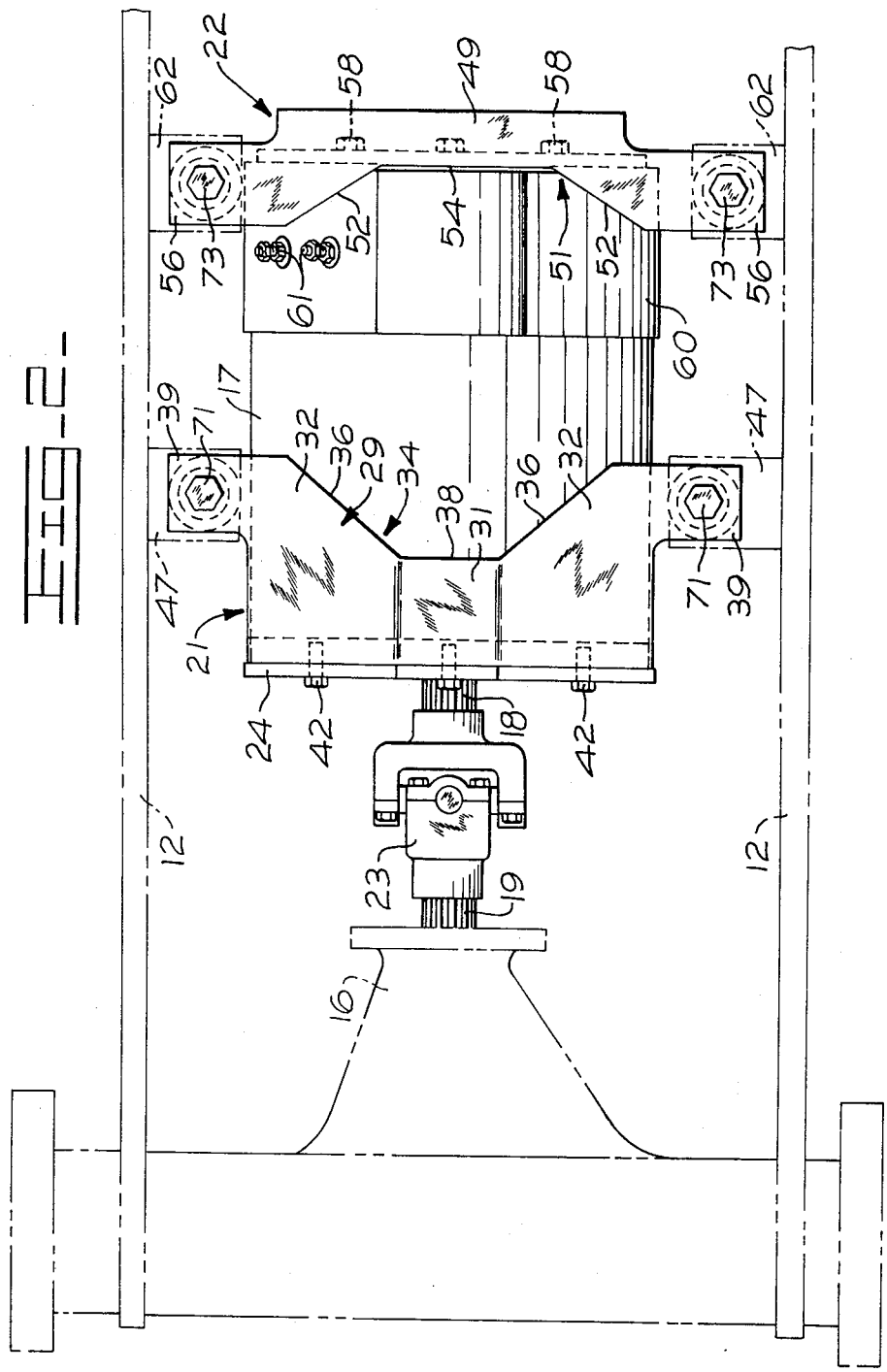
FIG. 2 is a plan view of the mounting and drive arrangement.

The ears facilitate resilient attachment of the bracket in a manner subsequently described to a pair of transverse lugs 47 oppositely projecting inwardly from the side panels 12 of the truck frame, as best shown in FIG. 2.

The rear support bracket 22 is generally similar to the front bracket 21 and includes a rectangular end plate 48 and integral upper plate 49 projecting rightangularly from the upper edge thereof. Unlike the upper plate 29 of the front bracket 21, the upper plate 49 of the rear bracket is planar. The leading edge of upper plate 49 is similarly preferably provided with a central dovetail notch 51 defined by converging rearwardly extending angular edge portions 52 terminating at the opposite ends of an edge portion 54 parallel to end plate 48. The outer side edges of upper plate 49 are formed with laterally outwardly projecting ears 56 adjacent the leading edge thereof.

Rigid attachment of bracket 22 to the motor 17 is facilitated by means of bolts 58 traversing aperture 59 provided in end plate 48 and threadably engaging circumferentially spaced taps formed in the rear end face of the motor. With the bracket 22 rigidly secured to the rear end face of the motor, the upper plate 49 engages the upper periphery of a circumscribing cowl 60 of the motor, which cowl is provided with the electrical input terminals 61 of the motor (see FIG. 2). The horizontal ears 56 facilitate resilient attachment of bracket 22 in a manner subsequently described to a pair of transverse lugs 62 oppositely projecting inwardly from the side panels 12 of the truck frame.

With regard to the resilient attachment of the brackets 21 and 22 to the frame lugs 47 and 62, it is to be noted that the lugs are respectively provided with apertures 63 and 64 which are traversed by tubular resilient pads 66 and 67 of rubber, or the like, having enlarged heads 68 and 69 which bear against the upper surfaces of the lugs. Bolts 71 extend through apertures 72 provided in ears 39, while bolts 73 extend through apertures 74 provided in ears 56. The bolts 71 and 73 thereafter extend through the bores of the pads 66 and 67 which traverse the lug apertures 63 and 64 and threadably receive nuts 75 and 76 which bear against the lower surfaces of the lugs 47 and 62.

The bracket ears 39 and 56 thus bear against the upper ends of the pad heads 68 and 69, although washers and shims, as generally indicated at 77, may be interposed if desired. The resiliently mounted brackets 21 and 22 thus serve to resiliently suspend the electric propulsion motor 17 from the truck frame in a horizontal position.

The resilient motor mounting in conjunction with the universal joint 23 serve to effectively absorb road shock and motor vibration.

Although the invention has been hereinbefore described and illustrated in the accompanying drawings with respect to a single preferred embodiment, it will be appreciated that various modifications and changes may be made therein without departing from the true spirit and scope of the invention, and thus it is not intended to limit the invention except by the terms of the appended claims.

What is claimed is:

1. In a vehicle including a frame, sets of front and rear wheels journalled at the opposite ends of said frame, a differential carried by said frame and coupled to one of said sets of wheels, and an electric propulsion motor having a rotary drive shaft for coupling to an input shaft of said differential, the combination comprising a pair of support brackets respectively rigidly secured adjacent the opposite ends of said electric propulsion motor, means for resiliently securing said brackets to said frame to suspend said motor in a horizontal position, and drive means for coupling said drive shaft of said motor to said input shaft of said differential, further defined by said brackets being rigidly bolted to the opposite end faces of said motor and having oppositely laterally projecting horizontal ears for securance to inwardly transversely projecting horizontal members of said frame, said resilient securing means comprising resilient pads traversing apertures in said horizontal members and having enlarged heads engaging the upper surfaces thereof, bolts extending through apertures in said ears and traversing said pads, and nuts threadably secured to said bolts and bearing against the lower surfaces of said horizontal members, said ears bearing against said heads of said pads, further defined by said brackets having end plates and integral rightangularly projecting upper plates, said end plates having apertures therethrough, said upper plates having said ears projecting from the opposite side edges thereof, and bolts traversing said apertures of said end plates and threadably engaging circumferentially spaced taps in the end faces of said motor, said upper plates engaging the upper periphery of said motor.

2. The combination of claim 1, further defined by said drive means comprising a universal joint.

3. The combination of claim 2, further defined by a first of said brackets having a generally rectangular end plate with an upper edge defined by a horizontal central portion and outer portions oppositely downwardly inclined therefrom, said first bracket having an upper plate substantially conformed to said upper edge of said end plate thereof and including a horizontal central portion with outer portions laterally oppositely downwardly inclined therefrom, said upper plate of said first bracket having a central dovetail notch defined by converging rearwardly extending angular edge portions of said outer portions of said upper plate of said first bracket terminating in the leading edge of said central portion thereof, said ears of said first bracket laterally outwardly projecting from the lower side edges of said outer portions of said upper plate of said first bracket adjacent the leading edge thereof, and a second of said brackets having a rectangular end plate and a planar upper plate having a central dovetail notch in the leading edge thereof, said ears of said second bracket laterally outwardly projecting from the opposite said edges of said upper plate of said second bracket adjacent the leading edge thereof.

* * * * *